United States Patent [19]

Clement

[11] 4,245,947

[45] Jan. 20, 1981

[54] SELF-LOADING CAR-TOP CARRIER

[76] Inventor: Clyde H. Clement, 8439 N. 13th Pl., Phoenix, Ariz. 85020

[21] Appl. No.: 936,234

[22] Filed: Aug. 24, 1978

[51] Int. Cl.³ ............................................... B60R 9/00
[52] U.S. Cl. ................................... 414/462; 224/310; 414/542; 414/541; 254/382
[58] Field of Search ............... 414/462, 463, 464, 921, 414/541, 542, 544; 224/310, 42.07, 42.44, 326, 328; 254/175.5

[56] References Cited

U.S. PATENT DOCUMENTS

| 3,401,804 | 9/1968 | Link | 414/140 X |
| 3,494,443 | 2/1970 | Huffhines | 414/138 X |
| 3,595,409 | 7/1971 | Bowman-Shaw | 414/544 |
| 3,777,922 | 12/1973 | Kirchmeyer | 414/462 |
| 3,823,839 | 7/1974 | Petzing et al. | 414/462 |
| 4,083,429 | 4/1978 | Abbott | 414/541 X |

FOREIGN PATENT DOCUMENTS

| 2343073 | 3/1975 | Fed. Rep. of Germany | 254/175.5 |
| 2013114 | 3/1970 | France | 254/175.5 |

*Primary Examiner*—Frank E. Werner
*Attorney, Agent, or Firm*—Drummond and Nelson

[57] ABSTRACT

A weather-protected, self-loading car-top carrier adapted to transport bulky loads and described in an embodiment suited for the transport of small motorized vehicles such as used by handicapped persons comprises a fixed rail assembly and a weather-protected carrier which, in response to operator control, moves along the rail assembly to provide access to a weather-protected storage space encompassed by the carriage assembly and includes provision for the automatic loading, under operator control, of bulky, heavy, awkward loads which would be difficult to handle by most persons and essentially impossible by one having limited or no use of their lower limbs.

1 Claim, 10 Drawing Figures

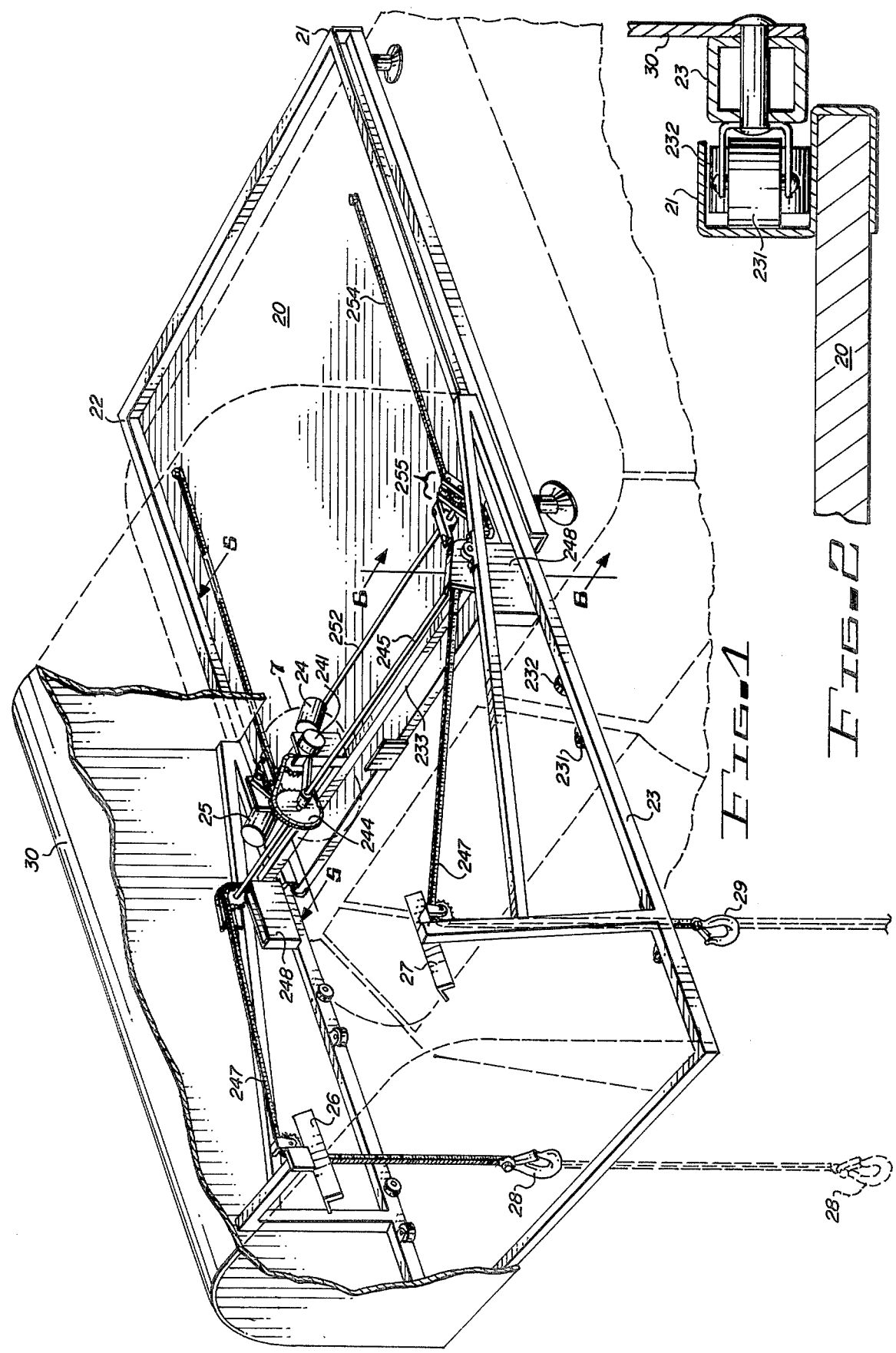

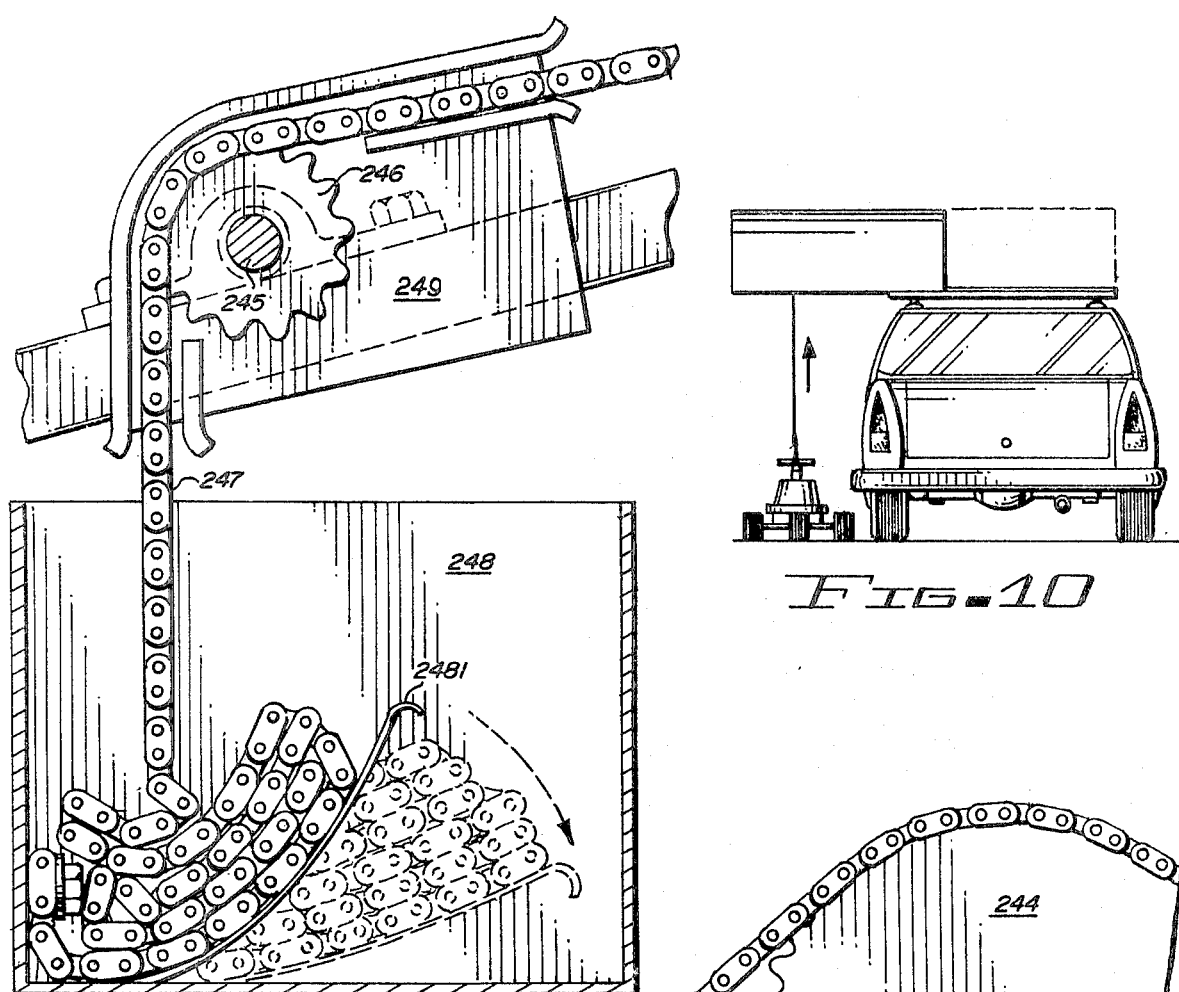
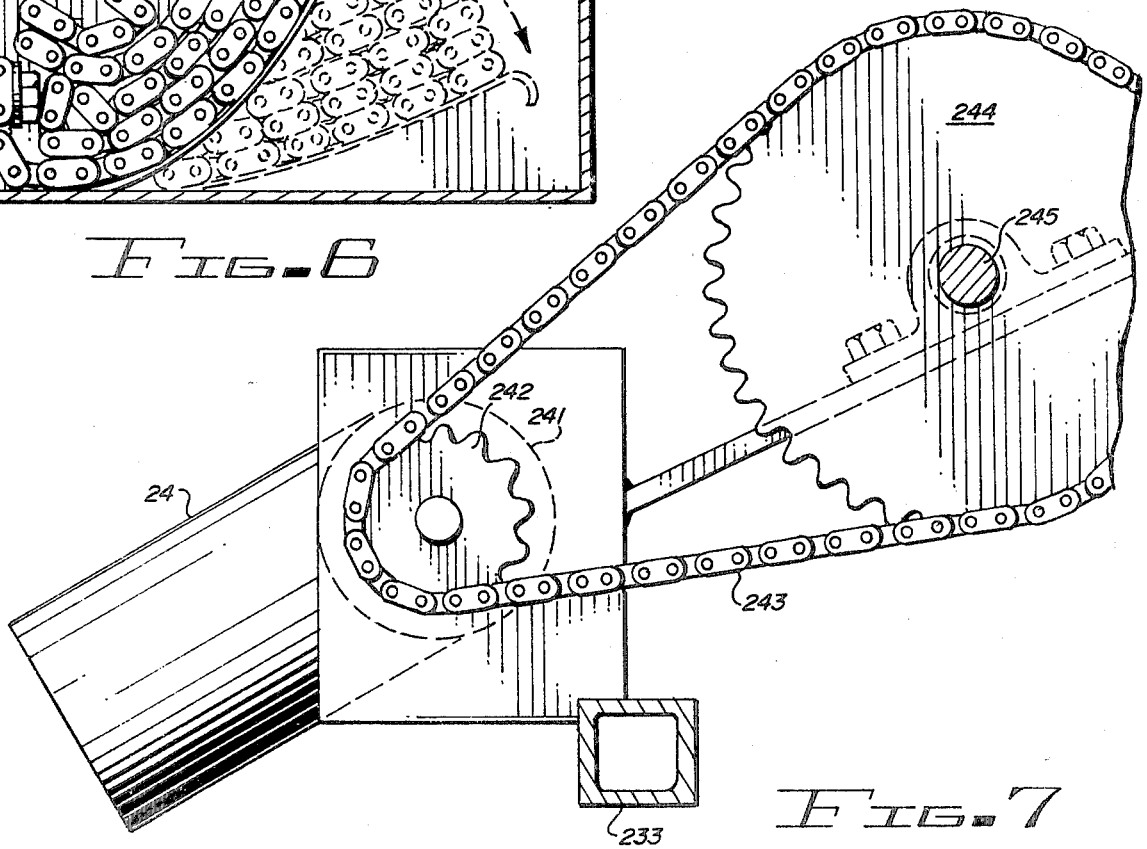

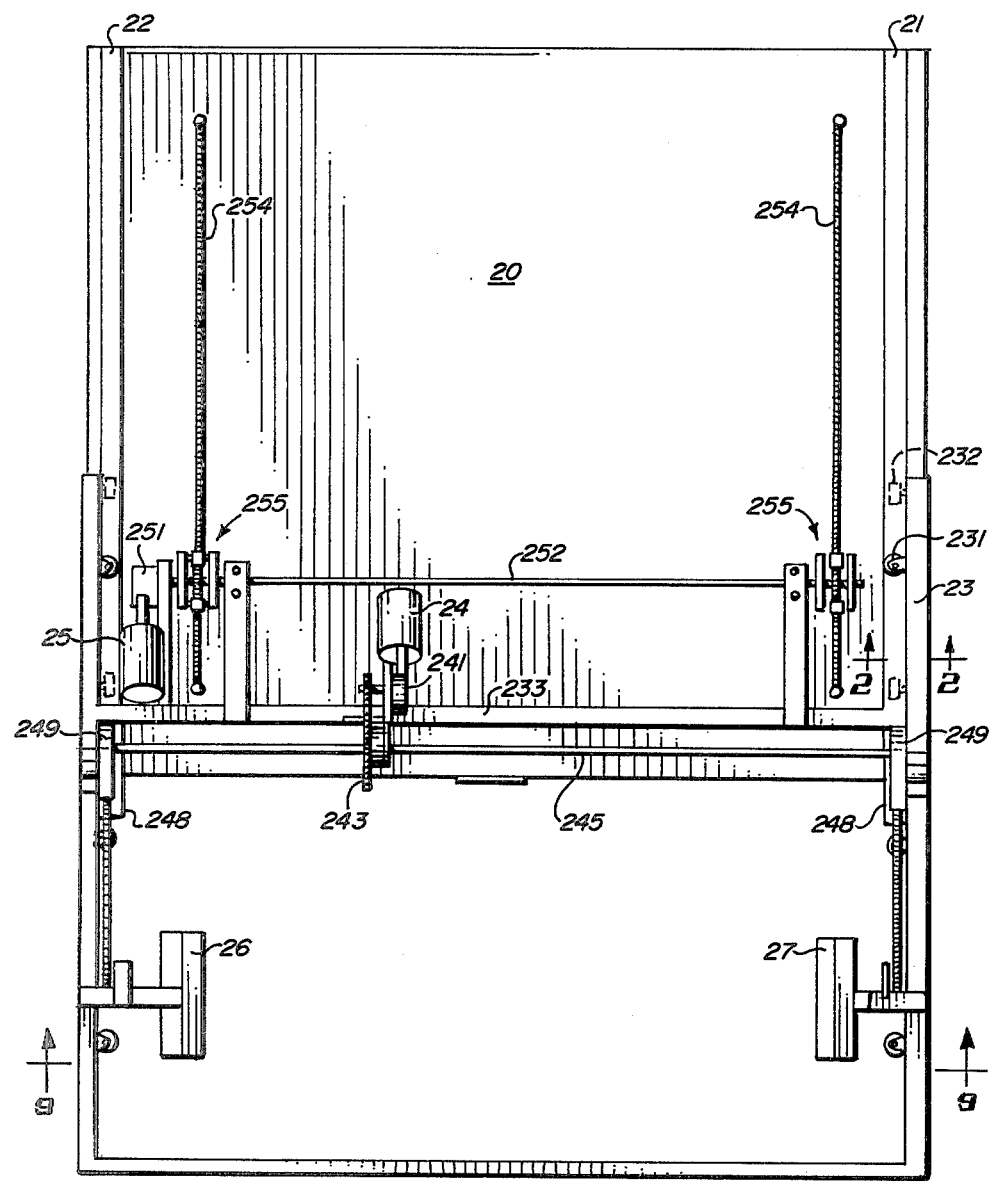
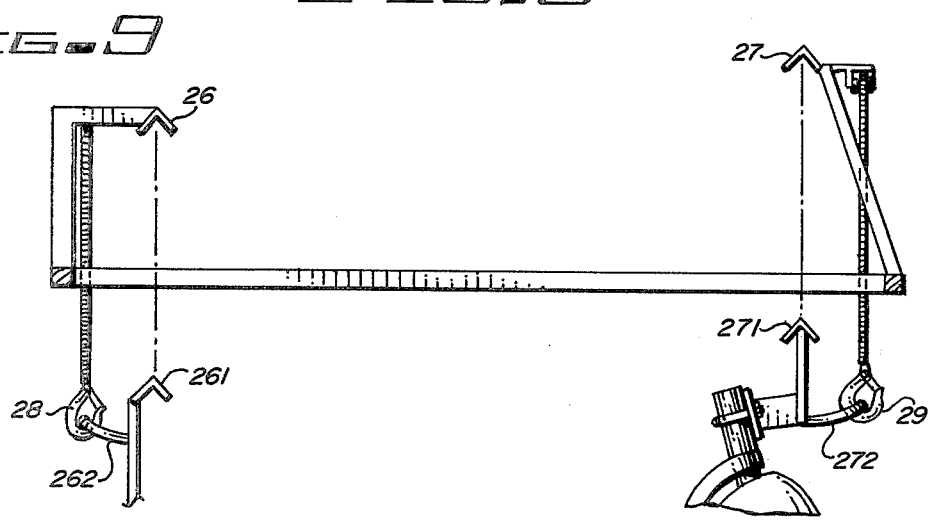

SELF-LOADING CAR-TOP CARRIER

BACKGROUND OF THE INVENTION

The invention relates in general to car-top carriers useful in transporting various materials by automobile.

In another respect, this invention relates to an improved car-top carrier which provides weather protection for the load.

In still another respect, the invention relates to a self-loading car top carrier adapted to transport small motorized vehicles such as used by handicapped persons. It may be easily modified for use with other weighty, difficult to handle loads such as field engineering equipment or salesmen's demonstration devices.

In yet another respect, the invention relates to an improved car-top carrier utilizing a drive mechanism which may be analogized to a rack and pinion drive, but a drive which is simpler, less expensive, and which lacks the critical tolerance requirements typically associated with rack and pinion drives.

In another important respect, the invention relates to a chain hoist having a novel means for accumulating excess chain and storing it.

The prior art discloses various means for transporting loads atop an automobile. Various expedients such as simple roof racks or ingenious commercial and homemade enclosures are familiar sights. Specialized car-top carriers are also available which provide mechanically assisted means for loading the car-top carrier under the control of an operator. Many of these self-loading carriers have been designed for the assistance of the handicapped. For example, U.S. Pat. Nos. 2,823,839; 3,878,955; 4,039,096 and 4,134,509, are all representative of self-loading car top carriers which are readily utilized by handicapped persons for the convenient transportation of wheelchairs. The modern wheelchair, which may be readily stored in a small volume of space, makes such car top carriers feasible.

Many handicapped persons find it more convenient or necessary to use small motorized vehicles such as the battery-operated tricycles commercially available today or battery-powered wheelchairs. Because of their size and weight, it is generally deemed to be impractical for a handicapped person to attempt to transport such vehicles in an ordinary passenger car. Because of the battery and the drive mechanism, these vehicles reach upwards of 100 pounds or more.

It would, therefore, be highly desirable to provide a self-loading weather-protected car-top carrier adapted to easily load and transport such small motorized vehicles as may be used by handicapped persons. It would be desirable generally to provide such a car-top carrier capable of handling weights on the order of 100 pounds or more and having mechanized means for self loading such heavy, awkward loads into said car-top carrier.

Accordingly, the principal object of the invention is to provide an improved car-top carrier readily adaptable to the various motorized conveyances presently available, or to be made available, for use by handicapped persons.

Another principal object of the invention is to provide a self-loading car-top carrier which operates so simply that a handicapped person may easily control its loading and unloading.

It is a further and more specific object of the invention to provide a self-loading car-top carrier having a relatively simple, inexpensive drive mechanism not subject to burn-out if overloaded or ineptly controlled.

It is a still further and more specific object of the invention to provide a car-top carrier which is simple, rugged and economical, which can be readily installed on a conventional automobile by persons of ordinary mechanical skill.

These and other objects and advantages of the invention will be apparent to those skilled in the art from the following detailed description thereof, taken in conjunction with the drawings, in which:

BRIEF DESCRIPTION OF THE DRAWINGS

FIG. 1 is a perspective view through the weather-protective cover of the self-loading car-top carrier, showing the innovative pseudo-rack-and-pinion drive and the hoist chain accumulator device.

FIG. 2 is a cross-sectional view of the rail which is traversed by the carriage assembly of the self-loading car-top carrier.

FIG. 6 illustrates the manner in which the hoist chain is constrained to maintain its contact with the hoist drive gear and the innovative manner in which the excess chain is accumulated and stored when the load has been hoisted in place aboard the car-top carrier.

FIG. 7 is an illustration of a simple drive mechanism used to raise and lower a load to and from the car-top carrier.

FIG. 8 is a plan view of the car-top carrier with the weather-protective cover removed.

FIG. 9 illustrates the hoisting of a load into the car-top carrier showing the placement of cradles on the load to be lifted and the cradle stops located in the car-top carrier. The load is raised until the cradle on the load nests into the cradle stop.

FIG. 10, adjacent FIG. 6, shows the carrier mounted atop an automobile and ready to hoist a typical three-wheel vehicle up to the carrier.

SUMMARY OF THE INVENTION

Figure 3:
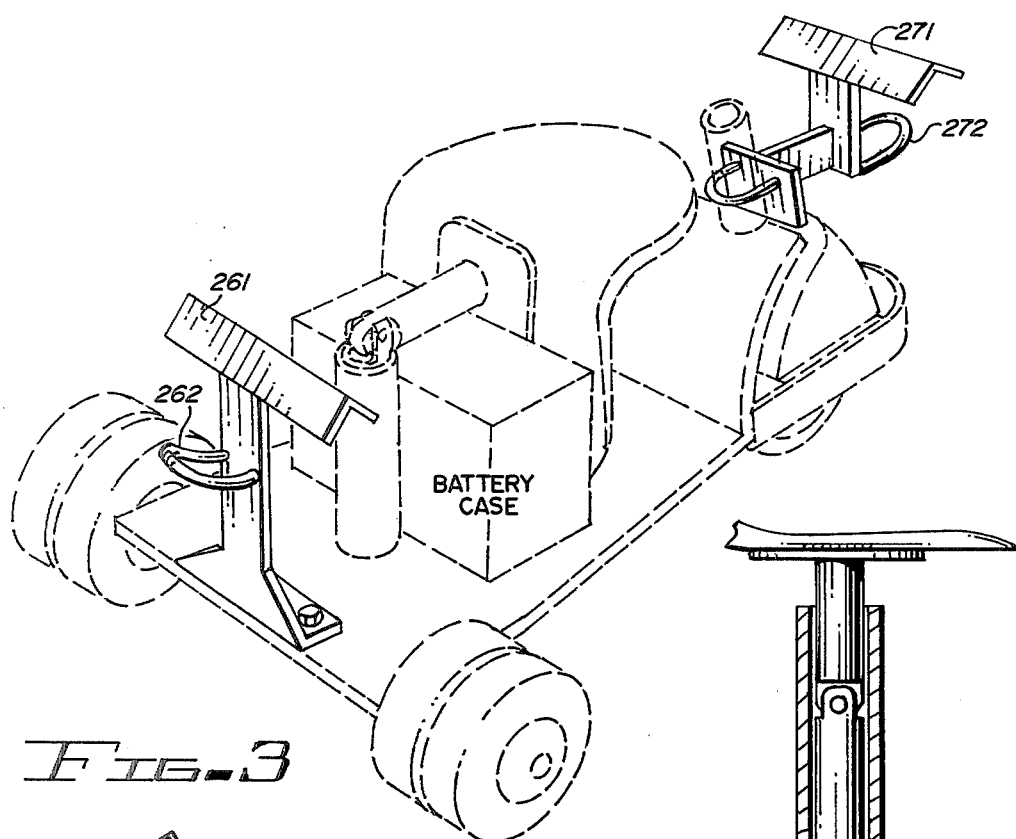
FIG. 3, in phantom outline, shows the typical three-wheel vehicle chosen to illustrate the concepts of the present invention. Modifications typical of those required to adapt such a three-wheel vehicle to loading in the innovative car-top carrier herein disclosed are shown by solid line illustration. The phantom outline illustrates the manner in which the driver's seat is stowed prior to loading in the car-top carrier.

Briefly, in accordance with the invention, I provide a baseplate, or baseboard, adapted for ready mounting to the rooftop of an automotive vehicle. On this base, guide rails are provided which are traversed by a movable carriage in response to drive force provided to a bogie-restrained "pinion" coupled to a chainlink "rack". The movable carriage includes a motor-driven chain hoist having innovative means for accumulating and storing the excess chain which must be maintained in order to lower a load to ground level. A weather-protective cover is provided so that the carrier's drive mechanisms and the load itself may be protected while the automobile is in transit or stored out of doors.

It should be borne in mind that the general innovative concepts to be disclosed here are in no way limited to the typical threewheel vehicle which was chosen strictly for illustrative purposes in describing one of many possible minor modifications of a preferred embodiment of the invention.

DESCRIPTION OF PREFERRED EMBODIMENTS

Turning now to the drawings in which a presently preferred embodiment of the invention is shown for purposes of illustration, FIG. 1 depicts the car-top carrier mounted atop an automobile roof and extended in the load/unload position. The carrier consists of a base 20 having rails 21 and 22 affixed to opposing ends thereof. A movable carriage assembly 23 is guided along rails 21 and 22 by means of roller guides, of which, roller guides 231 and 232 are typical. The detail of FIG. 2 illustrates the working relationship of the roller guides and rails 21. Roller guides such as 231, as illustrated here, have their axes of rotation vertical. Roller 231 bears against the vertical side of rail 21 while roller guide 232 bears against one of the horizontal surfaces of rail 21. When one considers that there are two rail assemblies 21 and 22 and similar arrangements of roller guides 231 and 232 along both sides of carriage assembly 23, it is seen that roller guides 231 tend to center the moving carriage assembly between rails 21 and 22 while roller guides 232 take up the vertical forces exerted on and by the carriage assembly.

In all of the figures provided, like reference characters represent identical elements. The perspective view of FIG. 1 and the plan view of FIG. 8 may both be referred to advantageously as the teachings of this invention are further presented.

The necessary hoist and carriage drive motors are mounted on and move with the carriage assembly 23. These comprise hoist drive motor 24 and carriage drive motor 25. Both motors are overload protected in that when they are stalled due to an overload, the drive power is automatically interrupted. Their operation may be described as being similar to that of the motors used to raise and lower windows in modern automobiles. A motor is used in the automobile to drive the window to its opened or closed limit. When the window has reached this limit, the drive is removed from the motor. The concept of such overload protected motors is well known in the art.

Hoist motor 24 is mounted to cross member 233 of carriage assembly 23. Hoist motor 24 is coupled through gear reduction box 241 to drive gear 242 (see FIG. 7), then via chain drive 243 to gear 244 which is directly coupled to hoist drive shaft 245. Drive shaft 245 is directly coupled to gear 246, FIG. 6, two of which are provided in the embodiment herein disclosed. Gear 246 drives hoist chain 247, one end of which is affixed in accumulator 248, and to the other end of which a means for attaching a load is affixed. In the embodiment herein disclosed, said means for attaching a load is a large hook having sufficient mass and size so as to be conveniently manipulated by a handicapped person as well as by one whose hand facility has not been impaired.

Accumulator 248 is provided for storage of the excess drive chain resulting when the hoist drive is driven to the full "up" position. Because of the nature of the drive chain, it has a tendency to bunch up and rise rapidly, soon overflowing the sides of any simple box means provided for its storage. The accumulator illustrated and taught herein provides a simple means for neatly accumulating the chain and stacking it in layers, the action being automatically self-controlled. Reference to the illustration of accumulator 248 in FIG. 6 will probably supply a more adequate understanding of the operation of the device than words themselves are capable of providing. A spring 2481, whose width approximates but does not equal, the width of accumulator box 248 is positioned such that the drive chain entering the accumulator box tends to rise up along the length of spring 2481. As the weight of the chain accumulates on the surface of spring 2481, the spring is depressed, causing the drive chain to bend and accumulate on top of the layer which had just been laid down on the surface of the spring. This accumulation further increases the bending of the spring which results in another reversal of the drive chain and causes it to lay another layer down in the opposite direction. The procedure continues, each layer being laid down causes a depression of the spring; and the repeated reversals of the chain as it is laid into the box causes a neat accumulation therein. The width of the accumulator 248 is selected in accordance with the width of drive chain 247 such that the chain may be easily accommodated therein, permitting the chain to accumulate one layer on top of the other, but preventing side-by-side accumulation of drive chain layers.

Because of its very nature, drive chain tends to be somewhat stiff especially when new or if not properly maintained, it would be found that there is a tendency for drive chain 247 to lift itself off drive gear 246 during the operation in which excess chain is stored within accumulator 248. To restrain this tendency of the drive chain 247 to divorce itself from gear 246, chain guide 249 is provided. FIG. 6 illustrates the manner in which guide 249 maintains chain 247 in contact with gear 246.

Figure 5:
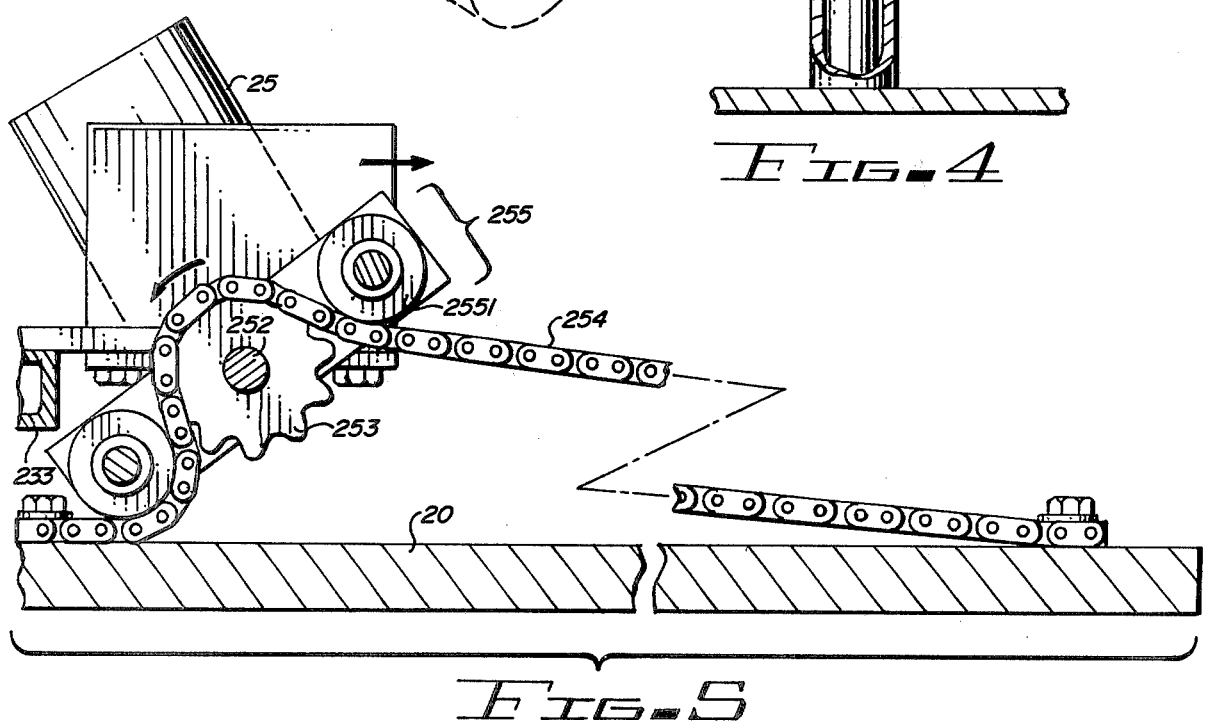
FIG. 5 illustrates the pseudo-rack-and-pinion drive comprised of a chain-link "rack" and a bogie-restrained "pinion".

As previously mentioned, drive motor 25 provides the impetus for movement of carriage assembly 23 along rails 21 and 22. With particular reference to FIGS. 2, 5 and 8, it may be seen that carriage drive motor 25 is coupled through gear reduction box 251 to carriage drive shaft 252. At this point, conventional teachings would frequently cause drive shaft 252 to drive a pinion which, in contact with a fixed rack, would cause the pinion to traverse the length of the rack as it was driven by drive shaft 252. Such rack and pinion drive assemblies tend to be very expensive, the rack being a very precise element of manufacture, and precision assembly technique are required in order that a cooperative working relationship of the rack and pinion shall be maintained if the drive is to function properly. To preclude the expense and manufacturing constraints imposed by the use of rack and pinion drive, the invention herein teaches the use of a chain drive and gear which function as a pseudo-rack-and-pinion drive. The pseudo-rack-and-pinion drive herein taught is extremely inexpensive when compared with the conventional rack and pinion drive and virtually eliminates worrisome tolerance buildup problems often encountered with equipments using conventional rack and pinion drives.

Two pseudo-rack-and-pinion drives are illustrated in the embodiment described. Like reference characters in each drive represent identical elements. The drive is illustrated in significant detail in FIG. 5. Drive gear 253, the pseudo-pinion gear, is directly coupled to drive shaft 252. The teeth of gear 253 mesh with the links of chain 254 which has both of its extreme ends affixed to base 20 and serves as a pseudo-rack as it cooperates with gear 253 to drive carriage assembly 23 along rails 21 and 22. To constrain the chainlink rack 254 in contact with gear 253, a two-wheeled bogie is utilized. Bogie assembly 255 is free to rotate about carriage drive shaft 252. The assembly comprises two bogie wheels 2551, one of each being located adjacent gear 253, as illustrated in FIG. 5 so as to maintain chainlink rack 254 engaged with the teeth of gear 253. This bogie arrangement eliminates the application of bending forces to drive shaft 252 which might otherwise exist were it necessary to tighten chainlink rack 254 to the extent necessary to maintain its contact with the gear teeth of gear 253. Because bogie assembly 255 is free to rotate about carriage drive shaft 252, it assumes two stable positions, depending upon the direction in which the carriage is being driven. For example, in the illustration shown in FIG. 5, assuming gear 253 is rotating in a counter-clockwise direction, carriage drive motor 25 as well as carriage assembly 23, will be driven from left to right of the illustration shown in FIG. 5. Bogie assembly 255 will assume the position shown with its right side higher than its left side. The bogie-restrained pinion 253/255 will thus traverse from right to left along chainlink rack 254 until it reaches the end of chainlink rack and causes motor 25 to stall. At this point, carriage assembly 23 will be in the fully stowed position and no longer overhanging the side of the motor vehicle preparatory for loading or unloading. When the drive to motor 25 is reversed, gear 253 is caused to rotate in a clockwise direction. This, in turn, causes the bogie-restrained pinion 253/255 to move from left to right along chainlink rack 254, as illustrated in FIG. 5. At this time, bogie assembly 255 will assume its complementary stable position with its left end, as illustrated in FIG. 5, raised and its right end lowered. The bogie assembly thus maintains the force relationship between chainlink rack 254 and gear 253 to be essentially a tangential force toward the outer diameter of gear 253. No bending force is exerted upon carriage drive shaft 252 and no unnecessary load is applied to carriage drive motor 25 since it is unnecessary to maintain a tensioning force on chainlink rack 254 in order to keep it in contact with gear 253. Thus, it is seen the chainlink-rack/bogie-restrained pinion drive disclosed here well serves the function typically provided by the more expensive, highly precise conventional rack and pinion drive usually employed by those skilled in the art.

The carriage assembly 23 is provided with cradle stops 26 and 27. When a load is to be hoisted into the car-top carrier, it is raised until contact is made with the cradle stop assemblies 26 and 27. At this point, hoist motor 24 stalls out, power is removed therefrom, and the carriage may be retracted to its stow position by applying power to carriage drive motor 25.

Figure 4:
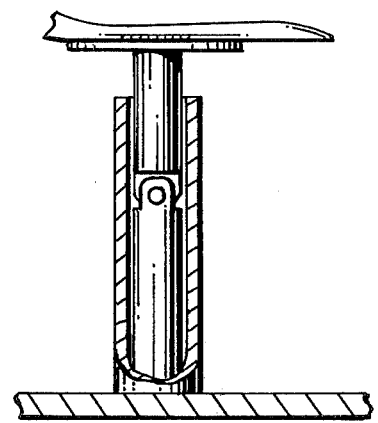
FIG. 4 is a cross-sectional view of the driver's seat of the typical three-wheel vehicle, illustrating the modification made to permit the seat to be stowed prior to loading in the car-top carrier.

To illustrate the operation of the invention, it will be assumed that a small three-wheeled, battery-operated vehicle such as illustrated in phantom outline in FIG. 3, is commercially available. It is further assumed that the handlebars necessary for steering the vehicle are removable and easily stored within the automobile on which the vehicle is to be transported. Such three-wheeled vehicles frequently provide that the seat may be removed while it is being transported. For our purposes, it will be assumed such a removable seat is modified as shown in FIG. 4 so that it may be placed in a stow position such as illustrated in phantom outline in FIG. 3. For use with the invention, the commercially available, battery-operated vehicle is modified by the addition of lifting devices 261 and 271. Lifting rings 262 and 272 are engaged by hoist hooks 28 and 29. Hoist motor 24 is energized and the load is raised until lifting devices 261 and 271 make contact with cradle stops 26 and 27 at which point hoist motor 24 stalls and its drive power is removed.

Once the load has been hoisted to the cradle stop position, the operator energizes carriage drive motor 25 causing the carriage to retract, carrying the load with it to the travel/stow position. Because the carriage is enclosed by carriage cover 30, weather protection is provided for both the load and the car-top carrier drive mechanisms.

FIG. 10 illustrates car-top carrier mounted atop an automobile and in the extended position with hoist chains attached to a typical three-wheel vehicle utilized by handicapped persons. In operation, a control unit is provided having switches to energize or deenergize the carriage drive motor and the hoist drive motor. The control device is attached to the vehicle so as to be conveniently accessible to a handicapped person. This may imply that a control box be provided having a retractable or self-stowing power cord. In utilizing the invention, the car top carrier is installed on the automobile roof so that when the load, in the example given here of a three-wheel vehicle for use by handicapped persons, is lowered into place, the handicapped person may slide from the seat of the car to the seat of the three-wheeled vehicle. He then disengages the hoist mechanism from the three-wheeled vehicle. Energizing hoist drive motor, he causes the hoist chain to be raised into the car-top carrier and stowed there. When the chain has been retracted to its stop position, the hoist drive motor will stall and the power automatically disconnected. The handicapped person then energizes the carriage drive motor, causing the weather-protected carriage to retract to the normal traveling position. The control box is then placed in the car for easy access by the handicapped person upon his return. He attaches the steering wheel or handlebar of the three-wheeled vehicle and is ready to travel.

Upon the return of the handicapped person to the automobile, the procedure is essentially reversed. He opens the car door and maneuvers the three-wheeled vehicle so as to provide himself easy access to the driver's seat of the automobile while also positioning the three-wheeled vehicle so as to be hoisted into the car-top carrier. He removes the steering wheel or handlebars from the three-wheeled vehicle, if such is required for storage and, taking the control device from the automobile, extends the carriage out over the three-wheeled vehicle. He then lowers the hoist chains and engages them to the lifting devices on the three-wheeled vehicle. At this point, he shifts himself into the automobile and stows the driver's seat of the three-wheeled vehicle if such is necessary for storage in the car-top carrier. He then energizes the hoist to raise the three-wheeled vehicle into the car-top carrier and then retracts the car-top carrier's carriage to its fully stowed position. He is then ready to drive his automobile with the three-wheeled vehicle safely stowed in the car-top carrier. Minor modifications of the procedure just described will of course be made as suits the convenience of the operator.

The car-top carrier described as a means of transporting a three-wheeled vehicle for use by handicapped persons is not limited to such use. Motorized wheelchairs which may be stored in a reasonable volume of space may also be transported using the carrier after the fashion described. It is important to note that any battery-operated device, such as those described here, will be raised into the car-top carrier and transported therein without danger of upsetting the battery of spilling battery acids. The load is raised from the ground and stowed in the car-top carrier for travel without any tilting or twisting maneuvers during the course of placing it into its stored position. The cradle on the lifting devices and the cradle-stop assembly on the car-top carrier carriage provide stability to the load while it is being transported.

The terms "cradle" and "cradle-stop", as used herein, are not defined as being limited to the particular structure disclosed herein. Rather the terms imply any means which provide a positive stop for the load when it is hoisted into place and which will maintain it in place in a stable position during transportation. Further, the term "gear" used herein, e.g., gears 242 and 253, is taken to include sprocket wheels or the like as used with link chain drives.

The teachings herein are readily adaptable to the lifting, stowage and transportation of many cumbersome loads other than transportation of devices for the handicapped, nor is it my intention to so limit its use. Having described my invention in such a clear and concise manner as to enable those skilled in the art to understand and practice it, and having described the presently preferred embodiments thereof,

I claim:

1. An improved vehicle top loader for raising an object off of the ground along side a vehicle to the vehicle top for storage thereon, said carrier comprising, (a) frame means adapted to be mounted on the top of said vehicle,
   (b) a carriage assembly carried by said frame means and moveable between at least two operative positions,
      (i) a stowed position with said carriage assembly positioned over the top of said vehicle, and
      (ii) a loading position with a portion of said carriage assembly extended outwardly from said frame means and over the ground along side said vehicle,
   (b') means for extending said carriage assembly,
   (c) means for engaging said object,
   (d) hoist means mounted on said carriage assembly for
      (i) suspending said engaging means from said carriage assembly so that said engaging means may receive said object, and
      (ii) raising said engaging means and said object to a storage position, such that during displacement of said object to said storage position rotation and tilting of said object is prevented, and
   (e) a cradle-stop assembly mounted on a horizontally outward portion of said carriage assembly located above said ground when said carriage assembly is extended in said loading position; said cradle-stop assembly for, in cooperation with said hoist means, securing said object in a fixed position on said carriage assembly when said object has been vertically displaced to said storage position, said cradle-stop assembly being fixedly positioned above the level of said frame means such that when said object is in said storage position said object is vertically positioned between said cradle stop assembly and a lower portion of said carriage assembly.

* * * * *